US009873567B2

(12) United States Patent
Andros et al.

(10) Patent No.: US 9,873,567 B2
(45) Date of Patent: Jan. 23, 2018

(54) METHOD AND SYSTEM FOR CROP HARVEST

(71) Applicants: Matthew James Andros, Santa Margarita, CA (US); Garett John Stapp, San Luis Obispo, CA (US); Thomas Klippenstein, Paso Robles, CA (US); Harrison Honerkamp, Paso Robles, CA (US)

(72) Inventors: Matthew James Andros, Santa Margarita, CA (US); Garett John Stapp, San Luis Obispo, CA (US); Thomas Klippenstein, Paso Robles, CA (US); Harrison Honerkamp, Paso Robles, CA (US)

( * ) Notice: Subject to any disclaimer, the term of this patent is extended or adjusted under 35 U.S.C. 154(b) by 817 days.

(21) Appl. No.: 14/247,703

(22) Filed: Apr. 8, 2014

(65) Prior Publication Data
US 2015/0284191 A1 Oct. 8, 2015

(51) Int. Cl.
| | |
|---|---|
| *B65G 21/14* | (2006.01) |
| *E21F 13/06* | (2006.01) |
| *E21F 13/00* | (2006.01) |
| *E21D 9/12* | (2006.01) |
| *B65G 35/04* | (2006.01) |
| *B65G 21/02* | (2006.01) |
| *E21C 35/20* | (2006.01) |

(52) U.S. Cl.
CPC ............ *B65G 35/04* (2013.01); *B65G 21/02* (2013.01); *B65G 21/14* (2013.01); *E21C 35/20* (2013.01); *E21D 9/126* (2013.01); *E21F 13/06* (2013.01); *B65G 2201/06* (2013.01)

(58) Field of Classification Search
CPC ...... A01D 46/243; A01D 46/00; A01D 46/28; B65B 25/046; B65B 25/02; Y10S 56/02; E04H 17/266; E21C 35/20; E21F 13/06; B65G 35/04; B65G 2201/06; B65G 2812/99; B60J 7/085; B60P 1/38
USPC ........ 17/145; 198/750.1, 812, 847; 242/557, 242/590, 919; 414/527, 539, 703; 53/390, 391
See application file for complete search history.

(56) References Cited

U.S. PATENT DOCUMENTS

| | | | | |
|---|---|---|---|---|
| 2,093,568 A | * | 9/1937 | McFarland | E21F 13/06 198/750.1 |
| 2,774,462 A | * | 12/1956 | Poundstone | B65G 21/14 198/812 |
| 2,846,051 A | * | 8/1958 | Craggs | B65G 15/26 198/812 |
| 3,356,341 A | * | 12/1967 | Brown | B21C 47/18 242/557 |
| 3,795,304 A | * | 3/1974 | Poundstone | B65G 35/00 198/750.1 |

(Continued)

*Primary Examiner* — Gregory Adams
(74) *Attorney, Agent, or Firm* — R. Scott Kimsey, Esq.; Klein DeNatale Goldner

(57) ABSTRACT

A method for transporting harvested crops from a field includes the step of providing a conveyor belt disposed adjacent a plurality of crops (such as alongside a row of crops or in-between rows). The conveyor belt has a spool attached thereto about which the conveyor belt can be wound. A winder is provided and has an attachment for receiving the spool. The spool is attached to the winder and, when crops being harvested are disposed on the conveyor belt, the winder is used to wind the conveyor belt around the spool, thereby transporting crops to the winder.

3 Claims, 7 Drawing Sheets

(56) References Cited

U.S. PATENT DOCUMENTS

| | | | | | |
|---|---|---|---|---|---|
| 3,796,298 | A | * | 3/1974 | Russell | E21D 9/126 |
| | | | | | 198/750.1 |
| 4,025,006 | A | * | 5/1977 | Turnbow | A01D 87/127 |
| | | | | | 242/564.5 |
| 4,292,784 | A | * | 10/1981 | Abatti | A01D 67/00 |
| | | | | | 414/345 |
| 4,736,574 | A | * | 4/1988 | Walker | A01D 46/243 |
| | | | | | 56/1 |
| 4,884,388 | A | * | 12/1989 | Ventura | B65B 5/105 |
| | | | | | 294/172 |
| 5,573,365 | A | * | 11/1996 | Michalski | B60J 7/085 |
| | | | | | 414/416.09 |
| 6,575,393 | B1 | * | 6/2003 | James, Jr. | A01G 13/0287 |
| | | | | | 242/390 |
| 7,011,270 | B1 | * | 3/2006 | Chouinard | E04H 17/266 |
| | | | | | 242/403 |
| 2010/0314482 | A1 | * | 12/2010 | Merkt | A01G 1/004 |
| | | | | | 242/557 |
| 2013/0230373 | A1 | * | 9/2013 | Pippin | B65G 67/08 |
| | | | | | 414/395 |

\* cited by examiner

METHOD AND SYSTEM FOR CROP HARVEST

RELATED APPLICATIONS

Not Applicable

BACKGROUND OF THE INVENTION

1. Field of the Invention

The present invention relates generally to an agricultural system and method, and more specific for a system and method for more efficient harvesting of crops in the field.

2. Background

Agricultural crop harvest has historically relied on manual labor to perform the bulk of the work required. While advances in the industry have reduced the reliance on manual labor, for some crops the nature of the crop and methods of growing and harvesting makes automation of some processes difficult.

In the table grape industry, for example, the spacing of various grape plants, the necessity to handle fruit delicately, the need for selective harvesting of the fruit, and the presence of trellises, all combine to make automated harvesting difficult. Instead, workers typically move between rows, picking fruit ready for harvest and placing the fruit into containers provided by workers. When the containers are full, they are carried to the end of the row where the fruit is combined with fruit picked by other workers. More recently, specially designed wheelbarrows have been used so that workers do not have to carry individual containers by hand. Trials using a tractor/trailer combination that traveled the length of the vinerow to pick up loaded containers still required hand labor for loading and unloading the tractor/trailer, and the tractor/trailer combination disturbed the soil, which contaminated the containers of harvested fruit. Further, a large percentage of the workers' time is still spent manually moving fruit and containers along each row, rather than spent picking fruit.

Whether containers are carried by hand, transported on wheelbarrows, or moved with a tractor/trailer combination, substantial manual labor is still required to move the fruit out from under the canopy to the edge of the field for field packing or to transport to a packing facility offsite. This leads to inefficiencies in the process, potential contamination of grape bunches with dust and soil, and increases the risk of workplace injuries during the transport of heavy loads.

SUMMARY OF THE INVENTION

The present invention provides a method and system for harvesting crops. In one embodiment, the method may include the steps of providing a conveyor belt in wound configuration adjacent the crops to be harvested, unwinding the conveyor belt so that it extends along the surface of the ground next to the crops, placing containers on the conveyor belt as it is unwinding so that the containers move with the belt alongside the crops, winding the conveyor after harvesting so that the conveyor belt and containers move along the ground as the conveyor belt returns to a wound state, and removing the containers from the conveyor belt as it is being wound.

The conveyor belt may be attached to a spool, and the steps of winding and unwinding the conveyor belt may be accomplished using a winder that removably receives the spool and automatically winds and unwinds the conveyor belt.

The method may include the step of configuring the ground adjacent the crops prior to unwinding the conveyor belt.

The method may include the step of transporting the conveyor belt to a second set of crops and repeating various steps recited above at that second location.

The method may include the step of providing a conveyor belt disposed on the ground adjacent a plurality of crops (such as alongside a row of crops or in-between rows). The conveyor belt has a spool attached thereto about which the conveyor belt can be wound. A winder is provided and has an attachment for receiving the spool. The spool is attached to the winder and, when crops being harvested are disposed on the conveyor belt, the winder is used to wind the conveyor belt around the spool, thereby transporting crops to the winder.

The winder may be powered using a vehicle power take off or auxiliary hydraulic system.

The method may also include the step of unwinding the conveyor belt to dispose the conveyor belt adjacent a plurality of crops.

A device for transporting harvested crops from the field may include a spool, a conveyor belt attached to the spool, and a winder having a spool attachment portion for removably receiving the spool. The conveyor belt has a wound state where the conveyor belt is wound about the spool, and an unwound state where the conveyor belt is extended from the spool such that the belt can be disposed adjacent a row of crops. Rotation of the spool causes the conveyor belt to be wound therearound, thereby transporting the harvested crops to the winder.

The device may also include a frame, wherein the spool is removably, rotatably attached to the frame.

The device may also include a platform extending from the first side of the winder to the second side of the winder. An unwound portion of the conveyor belt may be disposed over the platform when the belt is in at least a partially unwound state.

The device may also include a first roller rotatably attached to the frame at a first edge of the platform and a second roller rotatably attached to the frame at a second edge of the platform. The first and second rollers aid in movement of the conveyor belt across then platform when the conveyor belt is being wound or unwound.

The device may also include a supporting leg extending from a portion of the frame that supports the platform. The supporting leg may be adjustable in length so that the angle of the platform with respect to the ground may be adjusted.

The device may also include a hitch attached to the rear or side of the device. The hitch is adapted to allow for attachment of a vehicle to the device.

The device may also include a spool adjuster for adjusting the angle of the spool.

The device may also include a frame adjuster for adjusting the angle of the frame.

The device may also include a motor fixedly attached to the frame, the motor in operative engagement with the spool and used to rotate the spool.

The device may also include a spool control operable engaged with said motor for controlling the speed and/or direction of rotation of the spool.

The motor may be powered by a vehicle power takeoff or auxiliary hydraulic system.

The frame may include a first platform support and a second platform support, the platform extending between the two. A first turnbuckle may be provided for adjusting the angle of the first platform support, and a second turnbuckle for adjusting the angle of the second platform support.

DETAILED DESCRIPTION OF THE INVENTION

As used herein, the term "crop" refers to any plant or portion of a plant to be harvested. In some cases, the entire plant is harvested, while in others just a portion thereof such as the fruit is harvested. The word "crop" encompasses both the broad and narrow definitions, and may be used to refer to an entire plant even when only a portion of the plant is harvested, or only to that portion which is harvested. The present disclosure uses grapes as an exemplary crop when describing the structure and operation of the present system and method. It is understood, however, that the present system and method may be utilized with any suitable crop and is not limited to use with grapes.

Figure 1:
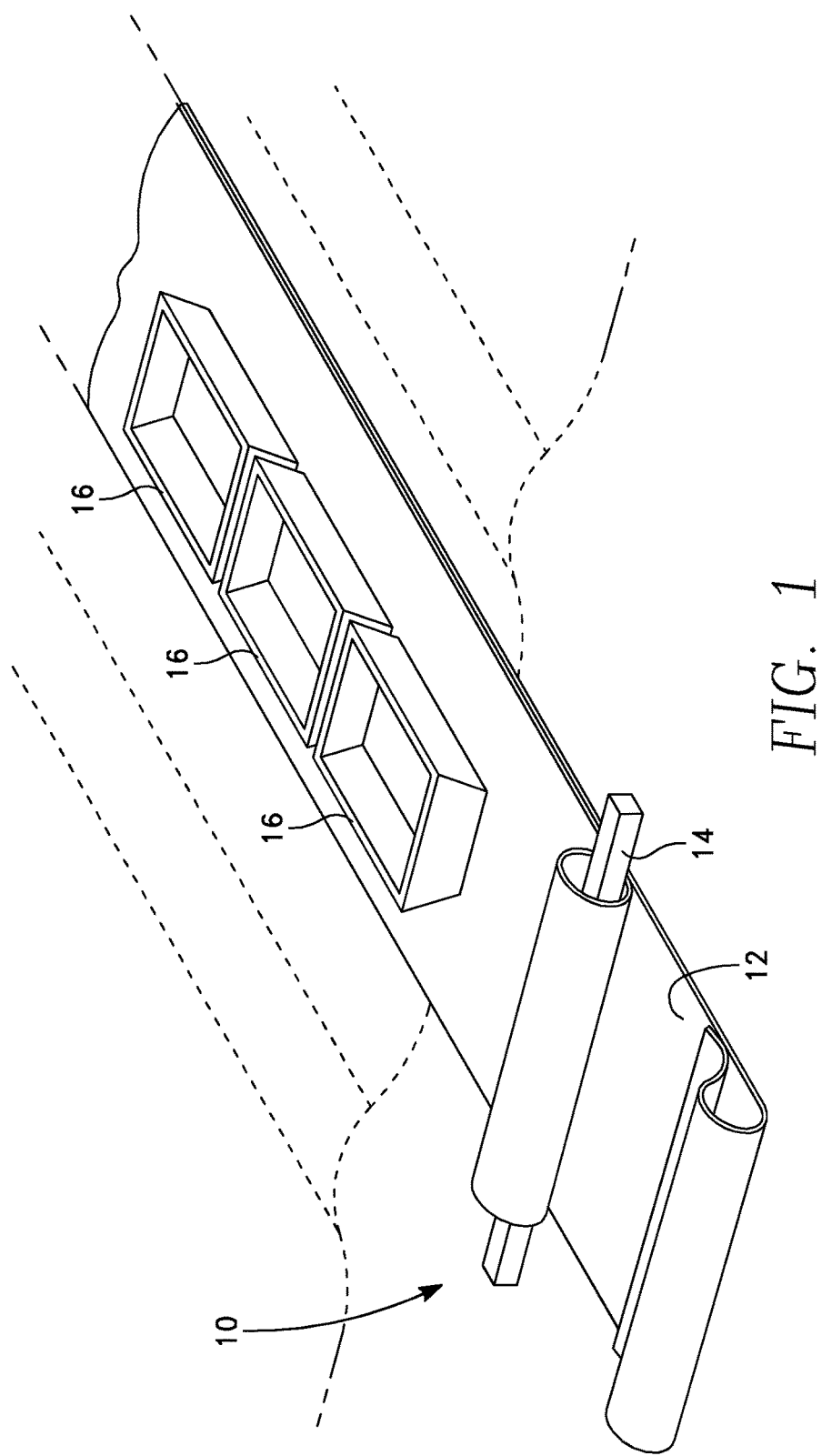
FIG. 1 provides a perspective view of a conveyor belt of the present invention disposed between adjacent rows of crops.

Turning to the drawings, wherein like numerals indicate like parts, FIG. 1 shows a portion of a harvesting system 10 of the present invention disposed on the ground in a vineyard, the parallel dashed lines indicating where adjacent rows of grape plants would typically be located. Shown between the rows of grape plants are conveyor belt 12 and containers 16 disposed thereon. Also shown is spool 14. As shown in the figure, the displayed components of harvesting system 10 are as they would be placed prior to attaching spool 14 to the rest of harvesting system 10 (namely, winder 48). As described more fully below, however, there are multiple methods of deploying the components of harvesting method 10, and the method shown in FIG. 1 is illustrative rather than limiting. Although the embodiment of harvesting system 10 shown in FIG. 1 includes a conveyor belt 12, it is contemplated that any suitable structure upon which crops may be placed, and which may be wound or retracted, transporting the crops therewith, may be utilized. Spool 14 may be of any suitable configuration, having for example a circular or square cross-section or any other suitable shape, and may be provided fixedly attached to one end of conveyor belt 12, or with an attachment structure allowing conveyor belt 12 to be removably attached thereto.

It should be noted that the present system and method may be viewed as using the vineyard floor as a "conveyor frame," the raised areas of ground where the rows of grape plants are located serving to flank conveyor belt 12 to prevent it from deviating too far from the desired path. This novel disposition of conveyor belt 12 eliminates the need for trucks, frames, or other structures along the rows of grape plants and greatly increases the portability of the present invention, the ease of use, and the ease of moving the necessary portions of the system from between one set of adjacent rows to another.

It is contemplated that the vineyard floor may be specially configured, if necessary, to accept conveyor belt 12. In other words, the ground between rows of grape plants may be smoothed, flattened, or shaped into a profile that facilitates accurate and predictable movement of conveyor belt 12 along the vineyard floor.

Figure 2:
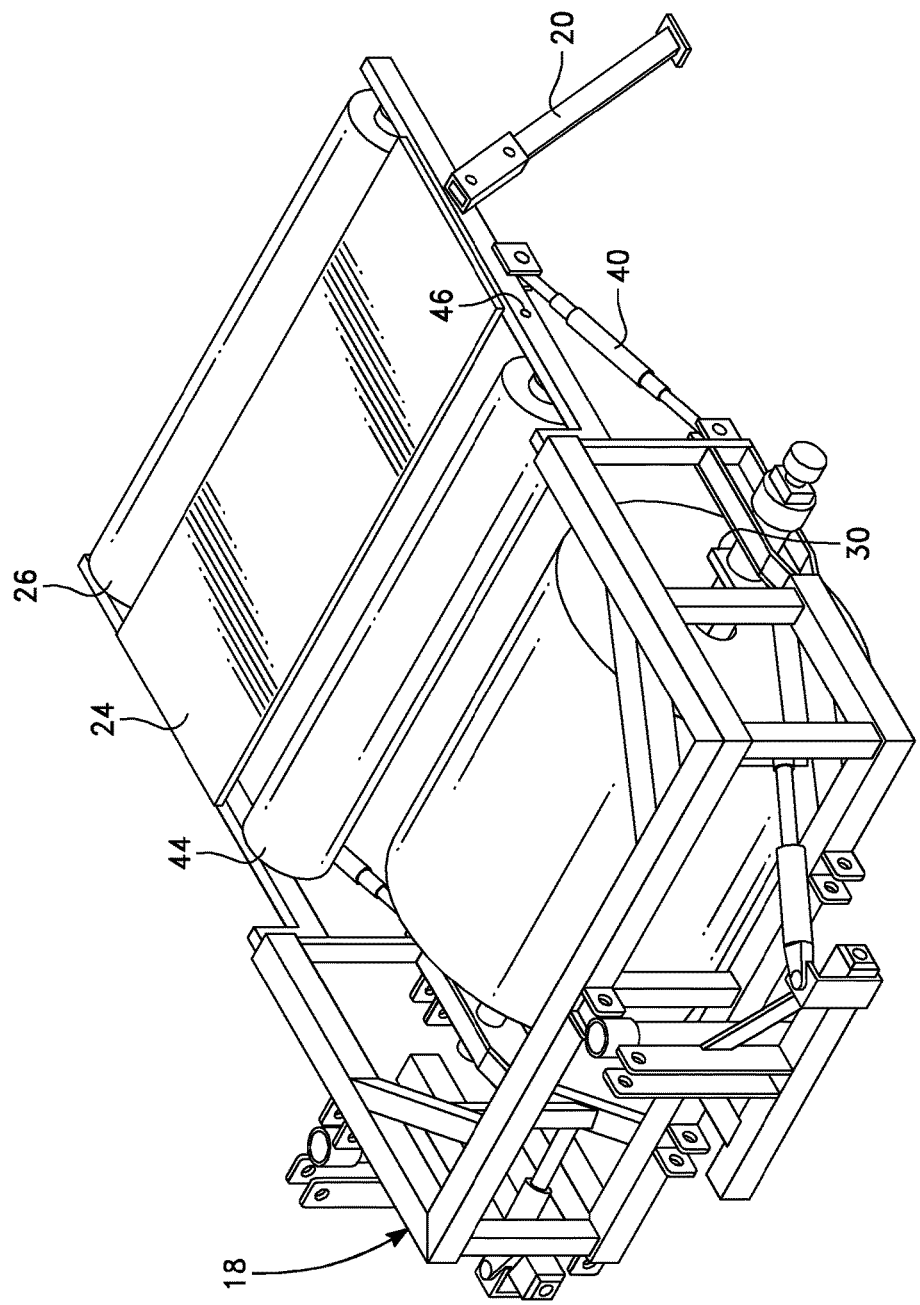
FIG. 2 provides a perspective view of a portion of a winder of the present invention.

FIG. 2 shows additional components of harvesting system 10, including frame 18, which supports various portions of the system The components shown in FIG. 2 collectively comprise winder 48. Spool 14 is shown with a first end of spool 14 secured in first spool lock 30 and a second end of spool 14 secured in second spool lock 32. In the embodiments shown in the figures, spool 14 is an arbor shaft that fits within a pocket in winder 48, though it is contemplated that any suitable winding/spooling mechanism or apparatus may be used. It is preferred that spool 14 have universal dimensions, allowing the spool to fit into multiple spool locks or pockets for transportation of the spool, layout, lifting, and storage, as well as winding. Conveyor belt 12 is shown wound around spool 14, though when distributed between a row of crops it extends away from spool 14 over rollers 44 and 26. Frame 18 supports first roller 26, which supports conveyor belt 12 and allows conveyor belt 12 to move thereover as it is reeled in by rotation of spool 14, described more fully below. A platform 24 is provided on frame 18 between first roller 26 and a second roller 44. Platform 24 provides a solid, flat surface for containers 16 as they travel along conveyor belt 12 to be gathered by workers or manipulated by a stacker/destacker designed to accept the harvest containers.

The structural supports of frame 18 supporting first and second rollers 26 and 44, as well as platform 24, are referred to herein as first roller support 46 and second roller support 47. First leg 20 and second leg 22 extend from first and second roller supports 46 and 47, respectively, and contact the ground, providing support and stability to first and second roller supports 46 and 47 when harvesting system 10 is in use. First turnbuckle 40 and second turnbuckle 42 are provided so that the angle at which first and second roller supports 46 and 47 extend from the remainder of frame 18 may be adjusted.

Figure 3:
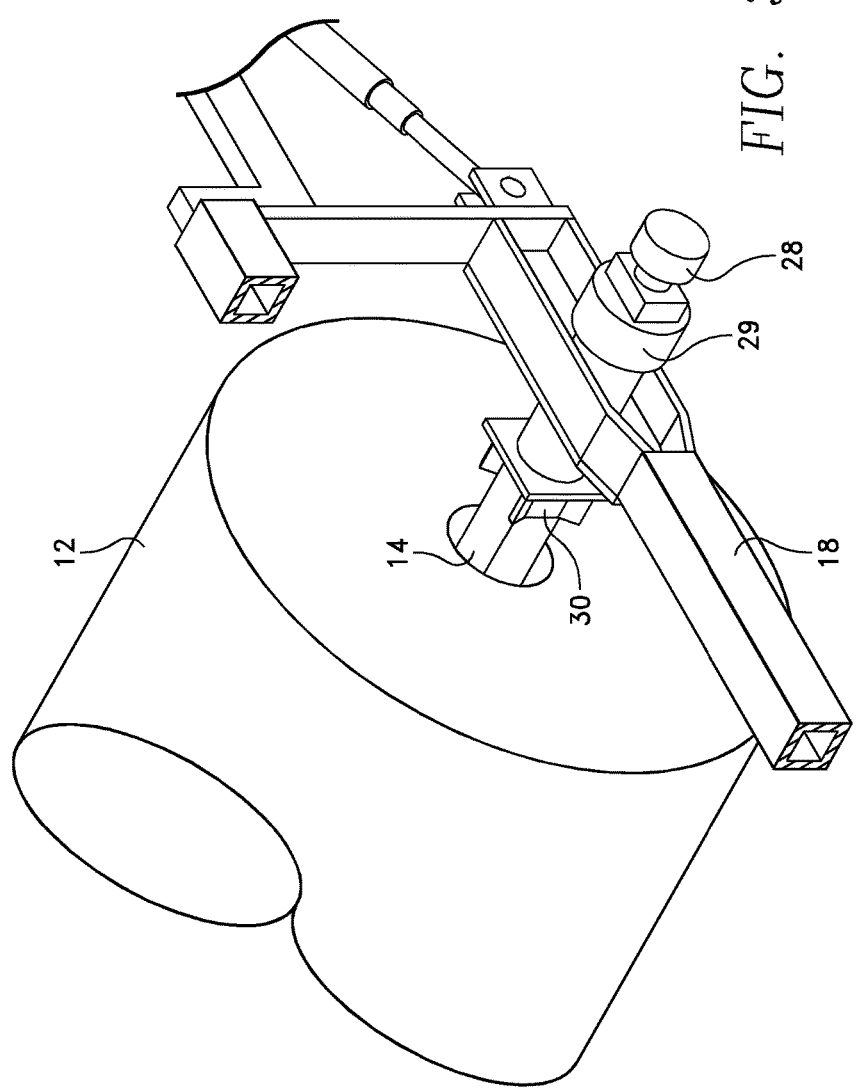
FIG. 3 provides a close perspective view of a portion of a spool and spool attachment of the present invention.

FIG. 3 provides a close view of spool 14, when secured to first spool lock 30 and second spool lock 32 (not shown), as well as of motor 28, which provides power for rotation of spool 14. Spool 14 may be secured to spool locks 30 and 32 by use of bolts, pins, or other suitable fasteners. Motor 28 is preferably powered by an auxiliary hydraulic system or power take-off from a tractor or other vehicle onsite when harvesting system 10 is in use. The speed of rotation of spool 14 may be controlled from the tractor or other vehicle, or may be controlled via harvesting system 10 itself, by use of speed control 34 (shown in FIG. 5). Also shown in FIG. 3 is planetary gear box 29. Motor 28 drives spool 14 via the planetary gear box.

Figure 4:
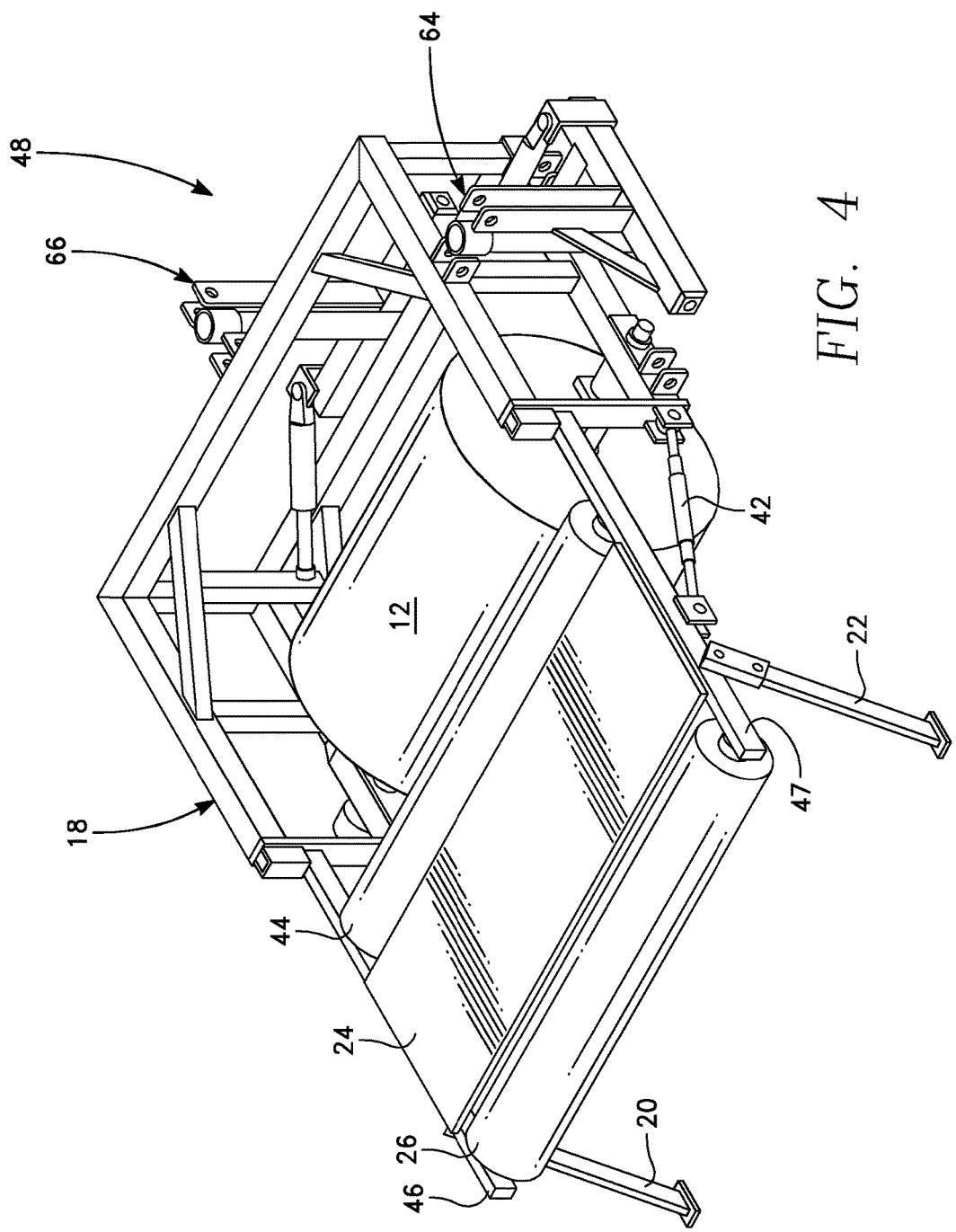
FIG. 4 provides a perspective view of a winder of the present invention.

FIG. 4 shows winder 48 as seen from the other side as compared to the view shown in FIG. 2. The components depicted are as described above. Also shown are first three-point hitch 64 and second three-point hitch 66, which may be utilized for attachment of a vehicle, such as a tractor, to winder 48. Such hitches are known in the art, and it is contemplated that any suitable hitch or attachment may be used. Further, winder 48 may include either one or both of three-point hitches 64 and 66, or any additional hitches necessary or desired.

Figure 5:
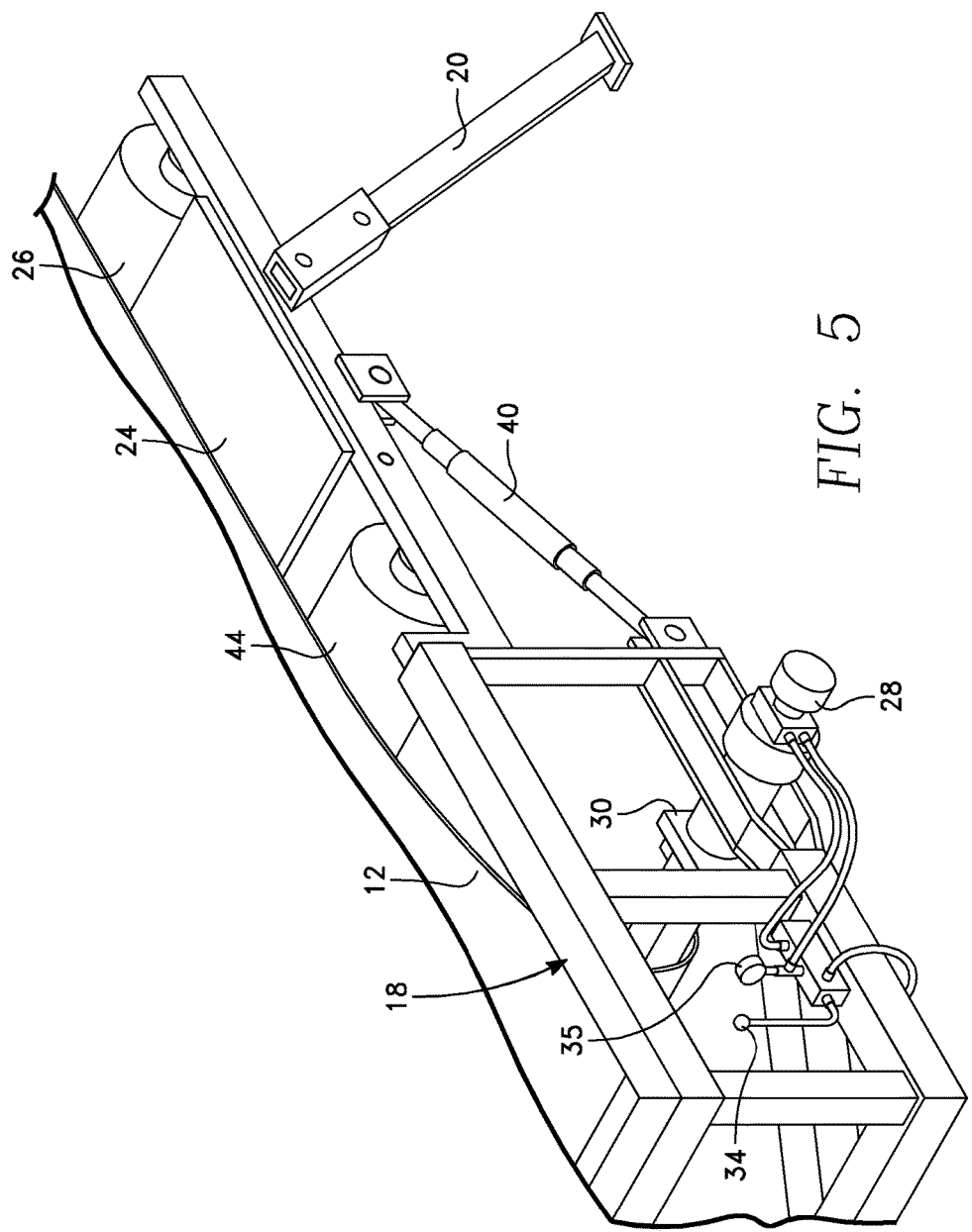
FIG. 5 provides a close perspective view of a motor, gear box, and controls of a winder of the present invention.

FIG. 5 is a close view of a portion of a winder 48 having a speed control 34 and a pressure gauge 35 associated therewith. Speed control 34 may be used to adjust the winding speed of spool 14, and in some embodiments of the invention the control may also be utilized to change the direction of rotation of spool 14 to wind or unwind conveyor belt 12. Pressure gauge 35 provides the user an indication of the hydraulic pressure required at the motor to wind or unwind the conveyor belt. The arrangement shown here is exemplary, and the controls for adjusting the speed and direction of rotation of spool 14 may be located within a vehicle associated with winder 48, or may be provided in any other suitable manner.

Figure 6:
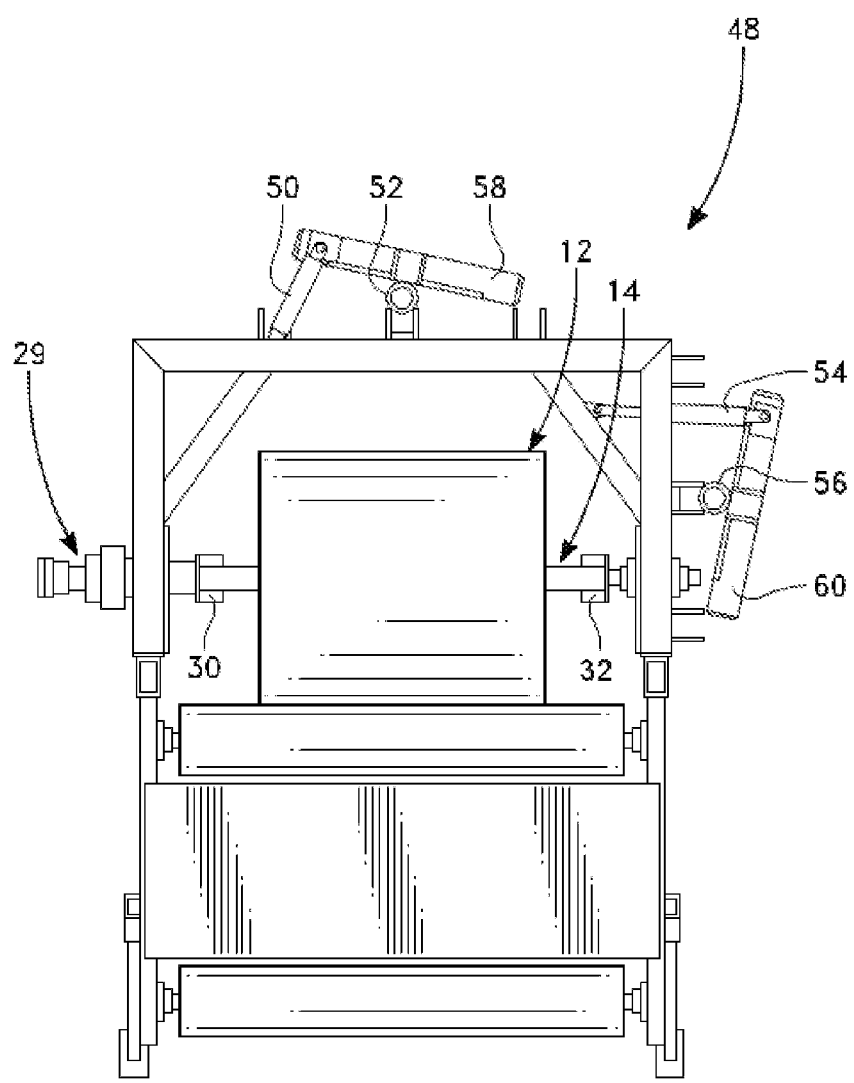
FIG. 6 is a top view of a winder of the present invention.

FIG. 6 provides a top view of a winder 48, with components substantially as described above. Also shown are structures for adjusting or tilting winder 48. Such adjustment or tilting maybe used to better position winder 48 on a surface on which it is being used, or, particularly in the case of the adjustment structure at the rear of winder 48, to ensure proper winding of conveyor belt 12 around spool 14 when winder 48 is in operation. The adjustment structure depicted at the rear of winder 48 includes a turnbuckle 50, crossbar 58, and a pivot 52. Adjustment of turnbuckle 50 allows the frame of winder 48 to pivot around pivot 52 while crossbar 58 is held securely to the vehicle being used to deploy winder 48. Likewise, the adjustment structure shown on the side of winder 48 includes a turnbuckle 54, crossbar 60, and pivot 56.

Figure 7:
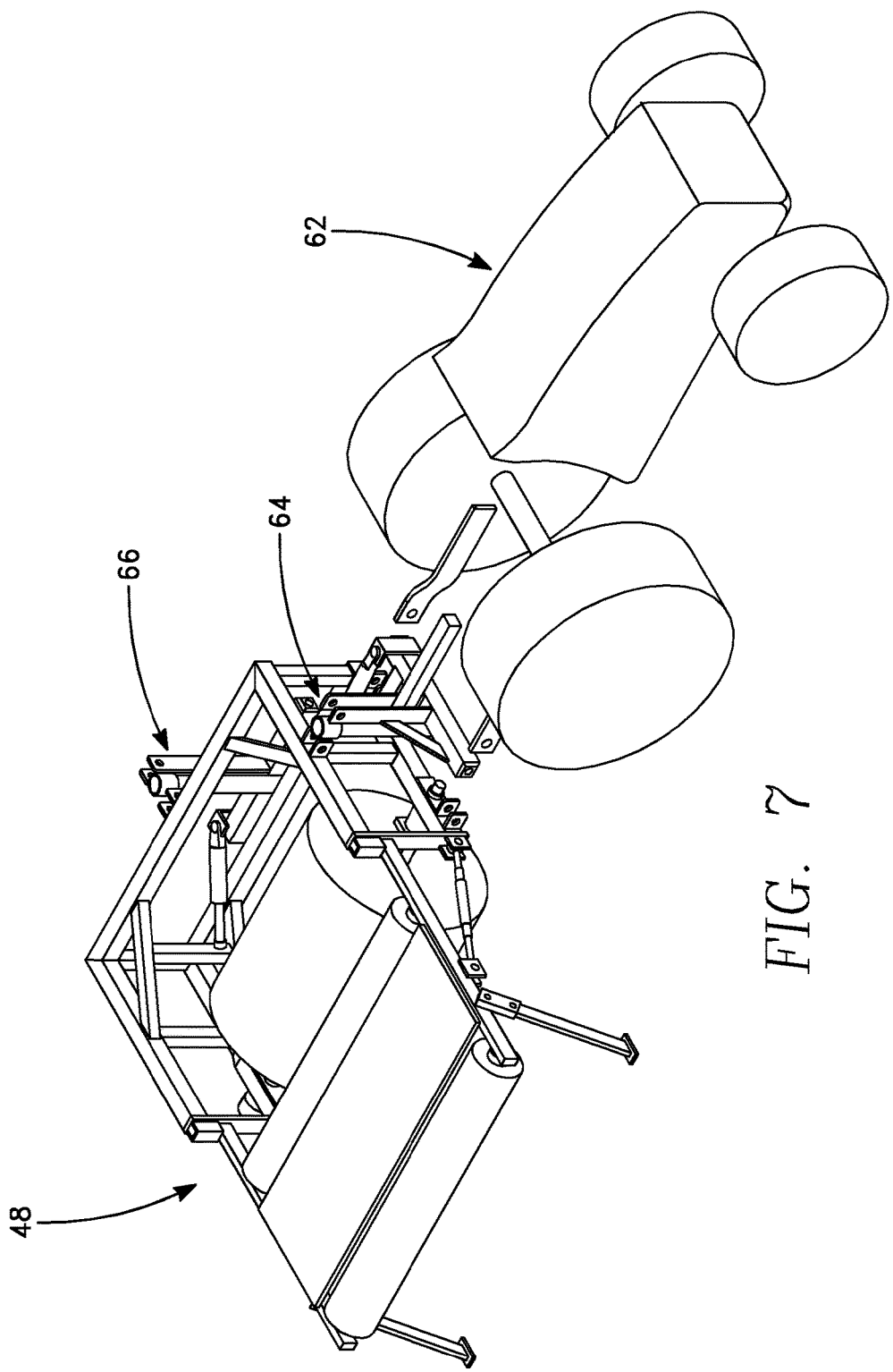
FIG. 7 is a side perspective view of an embodiment of a winder of the present invention, the winder being attached to a vehicle.

FIG. 7 shows a perspective view of one embodiment of winder 48 having a tractor 62 associated therewith. In the embodiment shown in FIG. 7, tractor 62 is attached to the side of winder 48 via three-point hitch 64, though three-point hitch 66 at the rear of the device is also shown.

The present system is portable and intended to be transferred from one location to the next for use, and also to be easily moved at a given location from one row of crops to the next. Conveyor belt 12 is disposed between rows of crops to be harvested, preferably directly on the ground. Containers 16 are spaced apart along the top of conveyor belt 12. In some situations, however, the present system and method may be used without containers 16, with crops being placed directly on conveyor belt 12. The remaining description refers to embodiments wherein containers 16 are utilized.

As noted above, conveyor belt 12 may be fixedly attached to spool 14, or may be removably attached thereto. In either case, spool 14 is attached to winder 48, preferably to a secure locking or attachment mechanism such as spool locks 30 and 32. With spool 14 in place, conveyor belt 12 extends over first roller 26, platform 24, and second roller 44, with the majority of the length of conveyor belt 12 stretching out between the rows of crops. It is contemplated that spool 14, with conveyor belt 12 attached, may be attached to winder 48 as soon as conveyor belt 12 has been laid along the ground between the rows, or may be attached to winder 48 only after containers 16 have been filled or crops have been placed on conveyor belt 12. In some circumstances, conveyor belt 12 may be wound around spool 14 and attached to winder 48 prior to placement of conveyor belt 12 on the ground. In such instances, winder 48 may be used to unwind conveyor belt 12 from spool 14 while users walk the unraveling conveyor belt 12 across the ground between the crop rows. In circumstances wherein conveyor belt 12 is being unwound by winder 48 as it is disposed across the ground between adjacent rows of plants, it is contemplated that containers 16 may be placed onto conveyor belt 12 as it is being unwound, and may thus be carried into position between the rows of plants by the movement of conveyor belt 12. Empty containers 16 may be staged at the end of the rows of plants for placement onto conveyor belt 12 as it is unwinding. It is further contemplated that multiple conveyor belts 12 and spools 14 may be provided between various rows of crops, and that winder 48 may be moved from one row to the next as each conveyor belt 12 is ready to be wound.

Once conveyor belt 12 has been properly positioned, workers move through the crop row, harvesting fruits, and placing them into containers 16. When containers 16 have been filled, winder 48 is used to wind conveyor belt 12 about spool 14, thereby transporting the crops to winder 48. The speed at which winder 48 winds conveyor belt 12 may be adjusted as necessary or desirable based upon the particular crops being harvested, the containers 16 used, ground conditions, and the like. Further, the angle at which roller support 46 is positioned may be changed depending on the foregoing conditions. In some embodiments of the present system, either or both of first and second rollers 26 and 44 may be eliminated from winder 48.

Various adjustments to the device, including to the angle of roller support 46 and/or the height of first and second legs 20 and 22, may be made as necessary or desired according to the characteristics of the specific field or other location where the present device is being used. These and other adjustments, including adjustments to the speed of winding of spool 14, allow the crops being harvested to be transported to winder 48 without being overturned or falling from conveyor belt 12. Also, as noted above, the condition of the ground between adjacent rows of plants may also be modified prior to implementing the present system and method. This may include grading, smoothing, or shaping the surface over which conveyor belt 12 will travel, removing obstacles such as rocks or plant material, or configuring the raised portions of ground upon which the plants are located so that the edges of those raised portions are made straighter, for a better travel path for conveyor belt 12, or may be sloped at an appropriate angle, and so on. Any such activity may be referred to herein as configuring the ground for use with the present system and method.

It is contemplated that the angle of spool 14 may also be adjustable, with spool 14 being moveable side to side, or tiltable between various angles, to ensure that conveyor belt 12 winds onto spool 14 in a straight manner. Tilting or moving spool 14 in one direction or another may restore conveyor belt 12 to the correct track when it shifts off-center. In some embodiments of the invention, guides may be provided along the path of conveyor belt 12, or on frame 18, to further ensure proper winding of conveyor belt 12 onto spool 14. Various types of controls may be provided for tilting or aligning the present device, and such controls may be provided within a vehicle used with the present device, at the point of the device itself (e.g. the winder), or both.

Various advantages of the present system and method will be readily apparent to those of skill in the art upon reading this disclosure. Use of the present method and system provides efficiencies realized multiple times in any given harvesting session, as workers move along the same row multiple times, selectively harvesting fruit. Various modifications to the system and method described herein will also be readily apparent to those of skill in the art upon reading this disclosure. Such modifications are understood to be within the spirit and scope of the present invention.

Having thus described the preferred embodiment of the invention, what is claimed as new and desired to be protected by Letters Patent includes the following:

1. A device for transporting harvested crops from the field comprising:
   a spool;
   a conveyor belt attached to the spool; and
   a winder comprising a spool attachment for removably receiving the spool, wherein the winder comprises a frame, and further wherein the spool is removably, rotatably attached to said frame;
   a platform extending from a first side of the winder to a second side of the winder, an unwound portion of the conveyor belt being disposed over the platform when the conveyor belt is in at least a partially unwound state, wherein the platform has a first side edge and an opposing second side edge;
   a first roller rotatably attached to said frame at the first side edge of said platform; and
   a second roller rotatably attached to said frame at the second side edge of said platform,
   wherein the conveyor belt is deployable between a wound state wherein the conveyor belt is wound about the spool and an unwound state wherein the conveyor belt is extended therefrom such that the conveyor belt can be disposed adjacent a row of crops to be harvested, and further wherein rotation of said spool to wind said conveyor belt therearound transports harvested crops disposed on the conveyor belt to the winder, and further wherein the first and second rollers aiding the movement of the conveyor belt across said platform when the conveyor belt is being wound or unwound.

2. The device according to claim 1 further comprising a supporting leg extending from a portion of said frame supporting said platform, the supporting leg adjustable in length so that the angle of said platform with respect to a ground surface may be adjusted.

3. The device according to claim 1 wherein said frame comprises a first platform support and a second platform support, the platform extending between the first platform support and the second platform support, the device further comprising a first turnbuckle attached to the first platform support for adjusting the angle of the first platform support, and a second turnbuckle attached to the second platform support for adjusting the angle of the second platform support.

* * * * *